United States Patent Office.

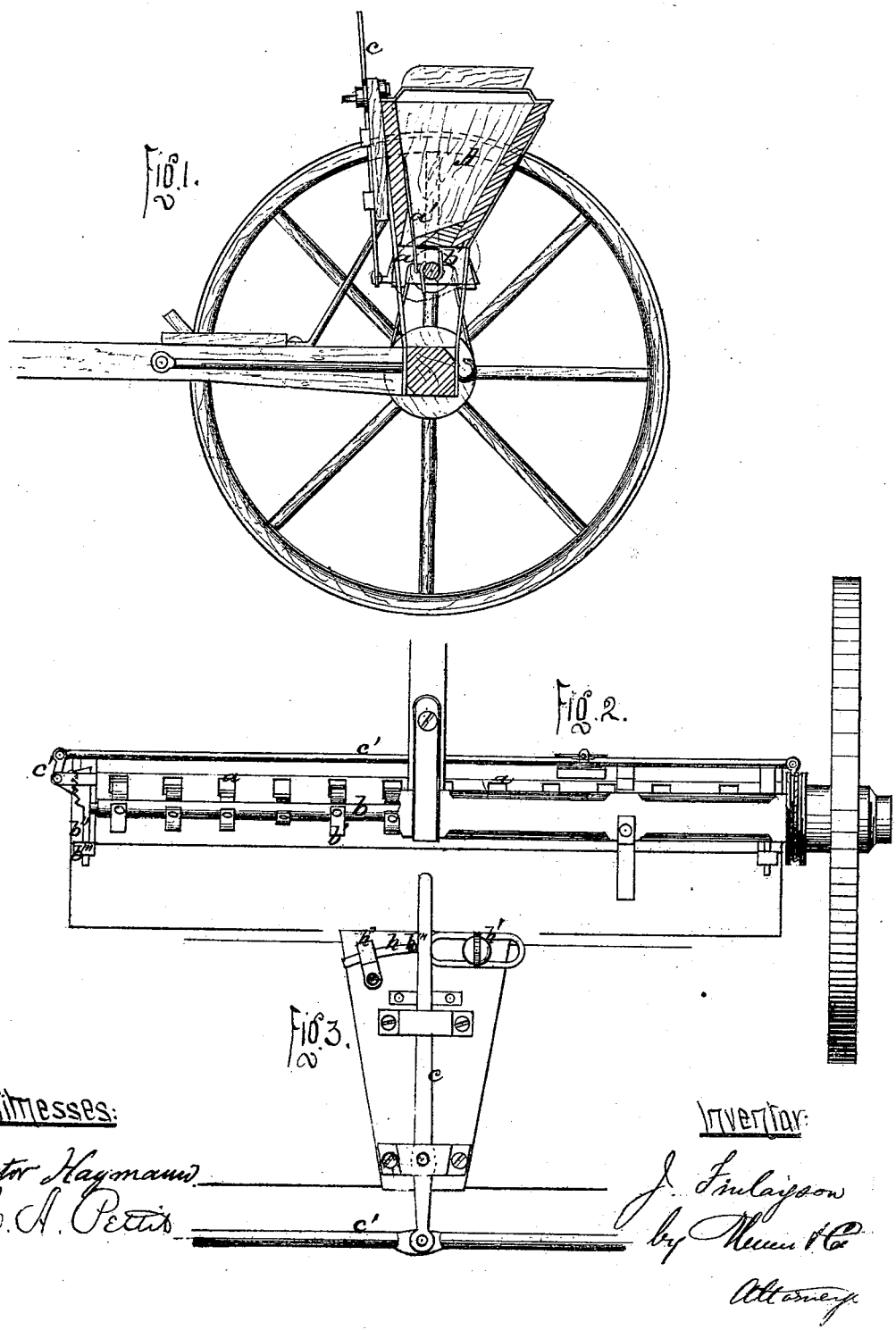

JAMES FINLAYSON, OF ALBANY, OREGON.

Letters Patent No. 97,898, dated December 14, 1869.

IMPROVEMENT IN SEEDING-MACHINES.

The Schedule referred to in these Letters Patent and making part of the same.

*To all whom it may concern:*

Be it known that I, JAMES FINLAYSON, of Albany, in the county of Linn, and State of Oregon, have invented a new and useful Improvement in Seeders; and I do hereby declare that the following is a full, clear, and exact description of the construction and operation of the same, reference being had to the accompanying drawings, making a part of this specification, in which—

Figure 1 is a transverse vertical section;

Figure 2 is a plan view of the machine inverted; and

Figure 3 is a partial front elevation, showing the regulating-device.

This invention consists in combining with the spring, whose office it is to guard the holes for the escape of grain in the bottom of the seed-box, a horizontal shaft, under the seed-box, provided with a suitable number of spurs, and rotated by belt or other connection with the driving-wheels, in such manner that said shaft may be made to approach the lower ends of the spring, near enough to allow its spurs to displace them sufficiently to open the grain-holes which they guard, and allow seed to drop; and that said shaft may be made to recede from the lower ends of the springs far enough to allow the latter to remain in place, and prevent any seed from dropping, there being also provided a device for regulating the distance to which the springs may be opened, and thus control the dropping of the seed, with respect to its amount.

In the drawings—

A is the seed-box, having the usual row of holes, $a$, in its bottom, said holes being guarded by spring-plates $a'$, fastened at their upper ends to the inside of the front of the seed-box, and projecting downward through the holes $a$, so as to close them, bearing against their rear sides, and extending far enough below the bottom of the seed-box to be within reach of the spurs $b'$, on the horizontal shaft $b$, supported beneath the seed-box in end plates $b''$, sliding transversely of the box in guide-ways $b'''$, projecting downward from the ends of the latter.

The shaft $b$ may be drawn near enough to the spring $a'$ to permit its prongs $b'$, as they rotate, to strike the lower ends of said springs, and thus intermittently open the holes $a$, the springs closing them again by their own recoil, after the passage of the spurs.

If it be desired that no seed shall be sown, the shaft $b$ is to be drawn away from the springs $a'$, so far that its spurs may not reach them.

This movement of the shaft $b$ is effected by means of a lever, $c$, having its fulcrum on the outside of the front of the seed-box, and pivoted at its lower end to a horizontal rod, $c'$, the extremities of which are jointed to the front ends of elbow-levers $c''$, the latter having their fulcra in arms of the brackets or guide-ways $b'''$.

The inner ends of the elbow-levers $c''$ have teeth upon them, which teeth engage with other teeth made in the sides of the sliding end-plates $b''$.

On moving, by means of the lever $c$, the rod $c'$, shown in fig. 2, to the left, the elbow-levers $c''$ throw the sliding plates $b''$ and shaft $b$ forward sufficiently far to bring the prongs $b'$ within impinging distance of the springs $a'$.

The shaft $b$ being rotated by means of a wheel on one end, connected by belting with a wheel, $e$, on the driving-shaft, effects, in the manner set forth, the dropping of the seed. On moving the rod $c'$ to the right, the dropping ceases.

Fig. 3 shows the regulating-apparatus, consisting of a slotted bar, $h$, upheld at one end by a set-screw, $h'$, and at the other end by socket $h''$, in which the bar may slide, and having a stop, $h'''$, on its front side, to limit the throw of the lever $c$.

The farther the lever $c$, in fig. 3, is moved toward the right, the wider the grain-holes in the seed-box are thrown open, and the more seed is dropped.

Having thus described my invention,

What I claim as new, and desire to secure by Letters Patent, is—

1. The adjustable shaft $b$, provided with the spurs $b'$, in combination with the springs $a'$, substantially as set forth.

2. The slotted bar $h$, provided with a stop, in combination with the lever $c$, substantially as specified.

The above specification of my invention signed by me, this 30th day of January, 1869.

JAMES FINLAYSON.

Witnesses:
L. FLINN,
J. C. POWELL.